US012691345B2

(12) United States Patent
Latiri

(10) Patent No.: US 12,691,345 B2
(45) Date of Patent: Jul. 28, 2026

(54) SWING-TYPE SPORTS APPARATUS MEASUREMENT DEVICE

(71) Applicant: Technorama Co., Ltd., Kaohsiung (TW)

(72) Inventor: Mondher Latiri, Kaohsiung (TW)

(73) Assignee: TECHNORAMA CO., LTD., Kaohsiung (TW)

( * ) Notice: Subject to any disclaimer, the term of this patent is extended or adjusted under 35 U.S.C. 154(b) by 294 days.

(21) Appl. No.: 18/417,020

(22) Filed: Jan. 19, 2024

(65) Prior Publication Data

US 2024/0316426 A1 Sep. 26, 2024

(30) Foreign Application Priority Data

Mar. 24, 2023 (TW) ................................. 112202723

(51) Int. Cl.
*A63B 60/42* (2015.01)
*G01M 1/12* (2006.01)
*A63B 102/18* (2015.01)

(52) U.S. Cl.
CPC ............. *A63B 60/42* (2015.10); *G01M 1/122* (2013.01); *A63B 2102/18* (2015.10)

(58) Field of Classification Search
CPC ..... A63B 60/42; A63B 2102/18; G01M 1/122
USPC ....................................................... 73/65.03
See application file for complete search history.

(56) References Cited

U.S. PATENT DOCUMENTS

| | | | | |
|---|---|---|---|---|
| 2004/0139793 A1* | 7/2004 | Bac | ........................ | A63B 60/42 |
| | | | | 73/65.01 |
| 2012/0073383 A1* | 3/2012 | You | ........................ | A63B 53/12 |
| | | | | 73/847 |
| 2018/0345105 A1* | 12/2018 | Latiri | ....................... | G01B 5/02 |

FOREIGN PATENT DOCUMENTS

TW I636243 B 9/2018

* cited by examiner

*Primary Examiner* — Nathaniel T Woodward
(74) *Attorney, Agent, or Firm* — Leydig, Voit & Mayer, Ltd.

(57) ABSTRACT

A measurement device for swing-type exercise equipment includes a pressure-holding unit having a base with a fixed frame configured with a pressure-holding component set and a top abutting component. The pressure-holding component set comprises an adjustment rod and an adjustment screw connected to the adjustment rod. The adjustment screw is provided with a first pressure block, which is connected to a second pressure block that can be freely attached and detached. The base is equipped with a locking shaft hole and a limiting hole, with a bolt threaded into the locking shaft hole and a limiting bolt in the limiting hole. The pressure-holding unit can rotate freely about the bolt in the locking shaft hole as the center of rotation, while the limiting hole and the limiting bolt restrict the rotation angle of the pressure-holding unit.

8 Claims, 8 Drawing Sheets

SWING-TYPE SPORTS APPARATUS MEASUREMENT DEVICE

CROSS-REFERENCE TO RELATED APPLICATIONS

The instant application claims priority to Taiwanese utility model application Ser. No. 112202723, filed Mar. 24, 2023, now registered as model registration no. M642652 as of Jun. 11, 2023, which is incorporated herein in its entirety by reference.

FIELD OF THE DISCLOSURE

This present disclosure relates to a measurement device for swing-type exercise equipment.

BACKGROUND OF THE INVENTION

Swing-type exercise equipment, such as bats, golf club shafts, baseball bats, cricket bats, tennis rackets, badminton rackets, table tennis paddles, or even paddle handles, typically comprise a gripping portion and a striking portion. Users grasp the gripping portion and swing the exercise equipment to strike a ball, propelling it forward. Due to their length, it is necessary to measure various mechanical and physical properties of these swing-type exercise equipment, including length, weight, center of mass (center of gravity), rotational moment of inertia, and swing cycle, to ensure compliance with sporting regulations and to provide users with a better understanding of the mechanical and physical properties of the equipment. This facilitates improved athletic performance when using the equipment.

In order to provide a convenient and precise means of measuring the mechanical and physical properties of swing-type exercise equipment, the applicant filed Taiwanese Invention Patent No. TWI636243. However, the gripping positions of swing-type exercise equipment can vary according to the requirements of competitions, affecting the equipment's sweet spot (optimal striking point) based on the user's gripping position. Hence, the creation of the present invention is warranted to address this issue.

Therefore, the challenge lies in how to provide a measurement device for swing-type exercise equipment that enhances the convenience of measuring different gripping positions on the equipment. This is a pressing issue awaiting resolution for manufacturers of measurement devices for swing-type exercise equipment.

BRIEF SUMMARY OF THE INVENTION

The present disclosure describes a device that conveniently measures three static mechanical characteristics, including length, weight, and the center of mass (center of gravity), when gripping different parts of swing-type exercise equipment. The device also measures the horizontal rotational inertia of dynamic mechanical characteristics, thereby enhancing the efficiency of the measurement device for swing-type exercise equipment.

To achieve this, the main technical solution implemented in the embodiments of the present disclosure is to provide a measurement device for swing-type exercise equipment. The measurement device comprises at least a pressure-holding unit, which is equipped with a base. The base is fitted with a fixed frame, and the fixed frame includes a pressure-holding component set and a top abutting component. The pressure-holding component set consists of an adjustment rod and an adjustment screw connected to the adjustment rod. The adjustment screw is provided with a first pressure block, which is connected to a second pressure block that can be freely attached and detached. The base is equipped with a locking shaft hole and a limiting hole, with a bolt threaded into the locking shaft hole and a limiting bolt in the limiting hole. The pressure-holding unit can rotate freely about the bolt in the locking shaft hole as the center of rotation, while the limiting hole and the limiting bolt restrict the rotation angle of the pressure-holding unit.

The effectiveness achieved through the main technical solution implemented in the embodiments of the present disclosure is that it facilitates the measurement of three static mechanical characteristics, including length, weight, and the center of mass (center of gravity), when gripping different parts of swing-type exercise equipment. Additionally, it measures the horizontal rotational inertia of dynamic mechanical characteristics, thereby enhancing the efficiency of the measurement device for swing-type exercise equipment.

BRIEF DESCRIPTION OF THE SEVERAL VIEWS OF THE DRAWING(S)

DETAILED DESCRIPTION OF THE INVENTION

Figure 1:
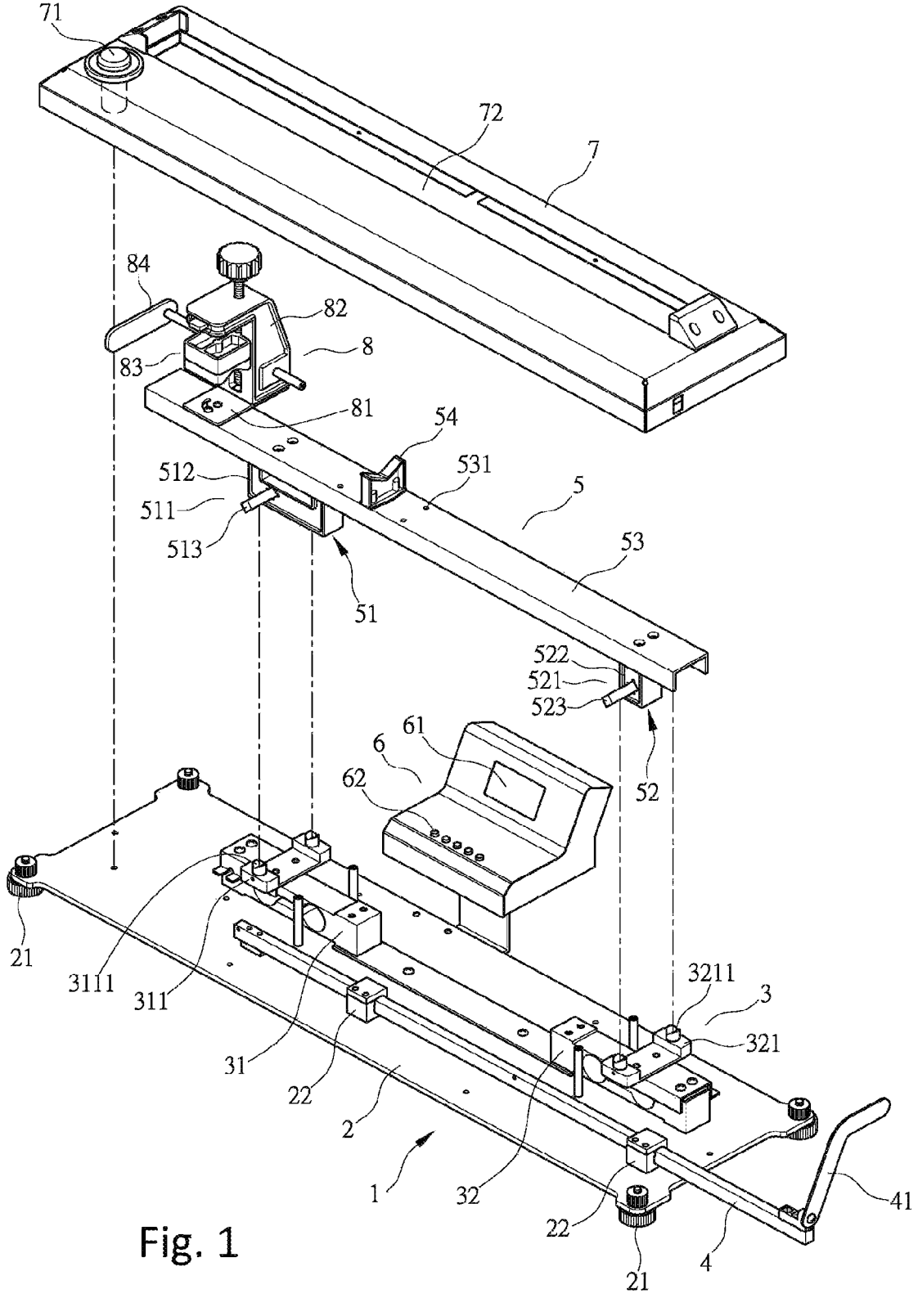
FIG. 1 is an exploded view of a measurement device for swing-type exercise equipment in accordance with the disclosure.

In reference to FIG. 1, a measurement device for swing-type exercise equipment in accordance with the disclosure, denoted as measurement device 1, includes a base 2, a weight unit 3 located on the base 2, a digital measuring unit 4 also located on the base 2 and positioned to the side of the weight unit 3, a scale seat unit 5 placed on top of the weight unit 3, a computing and display unit 6 set on one side of the base 2 and electrically connected to the weight unit 3, a pressure-holding unit 8 at one end of the scale seat unit 5, and a cover 7 placed on top of the base 2.

As shown in FIG. 1, the base 2 is implemented as a long rectangular body. The four corners of the base 2 are equipped with adjustable support footpads 21, which are used to adjust the levelness of the base 2. The base 2 has two insert blocks 22, which allow the digital measuring unit 4 to be inserted and freely moved. The weight unit 3 is positioned on the side of the base 2 near these insert blocks 22.

As shown in FIG. 1, the weight unit 3 is positioned near the center of the base 2. The weight unit 3 comprises a first weight unit 31 and a second weight unit 32, both of which are electronic scales. The first weight unit 31 and the second weight unit 32 are electrically connected to the computing and display unit 6. This allows the weight values measured by the first weight unit 31 and the second weight unit 32 to be displayed on the computing and display unit 6.

As shown in FIG. 1, the digital measuring unit 4 is inserted into the insert blocks 22 on the base 2 and can freely slide on these insert blocks 22 to measure length. The end of the digital measuring unit 4 is equipped with a measuring stopper 41.

As shown in FIG. 1, the scale seat unit 5 is mounted on top of the weight unit 3. The scale seat unit 5 includes a first scale seat 51, a second scale seat 52, and a support frame 53 connected to both the first scale seat 51 and the second scale seat 52. At one end of the support frame 53, the pressure-holding unit 8 is installed.

As shown in FIGS. 1, 2, 3, 4, and 5, the pressure-holding unit 8 is equipped with a base 81, which is implemented as a flat plate in this invention. The base 81 has locking holes 811, locking shaft holes 812, and limiting holes 813. The locking holes 811 are implemented as pairs on the left and right sides. The locking shaft holes 812 can be locked onto the scale seat unit 5 using bolts 8121, allowing the base 81 to rotate freely about the bolts 8121 as the center of rotation. The limiting holes 813 are implemented as arc-shaped slots in this invention, and they contain limiting bolts 8131.

The limiting bolts 8131 pass through the limiting holes 813 and are threaded into the support frame 53. The pressure-holding unit 8 includes a fixed frame 82 locked onto the base 81. The fixed frame 82 is implemented as an inverted L-shaped body, with its lower end locked onto the base 81. The upper end of the fixed frame 82 has a protruding portion 821 that extends to one side and contains a through-hole 822 running vertically through it. This through-hole 822 allows the pressure-holding component set 83 to pass through.

The pressure-holding component set 83, from top to bottom, includes an adjustment rod 831, an adjustment screw 832 threaded beneath the adjustment rod 831 for spiral adjustment, an engagement component 833 for engaging the adjustment rod 831 and adjusting it up and down, a first pressure block 834 located at the upper end of the adjustment screw 832, and a second pressure block 835 that can magnetically attach to the bottom surface of the first pressure block 834.

Below the fixed frame 82, there is a through-hole 823 that accommodates a top abutting component 84 that can slide freely. The entire pressure-holding unit 8 can rotate about the base 81. More specifically, the base 81 can rotate freely about the bolt 8121 in the locking shaft hole 812. The rotation of the base 81 is limited to approximately ninety degrees by the limiting hole 813 and the limiting bolt 8131. Consequently, when the base 81 rotates, it can drive the entire pressure-holding unit 8 to rotate.

As shown in FIGS. 3, 4, 6, and 7, the upper end of the adjustment rod 831 in the pressure-holding component set 83 has a knob section 8311. Below the knob section 8311, there is a threaded section 8312 that extends downward and can be threaded onto the adjustment screw 832. The threads on the threaded section 8312 are the same as those on the adjustment screw 832.

The fixed frame 82 has a sliding groove hole 824 that extends into the protruding portion 821. At the bottom of the sliding groove hole 824, there is a smaller-diameter mounting hole 825. The sliding groove hole 824 is connected to the through-hole 822 near the mounting hole 825. The engagement component 833 is inserted into the sliding groove hole 824. An elastic element S is installed inside the mounting hole 825. In this invention, the elastic element S is implemented as a telescopic spring. One end of the elastic element S abuts against the bottom of the mounting hole 825, and the other end abuts against one end of the engagement component 833. This allows the engagement component 833 to be pressed into the sliding groove hole 824, and when pressure is released, the elastic element S pushes the engagement component 833 back to its original position.

One end of the engagement component 833 has a through-hole 8331. Inside the through-hole 8331, there is a threaded section 8332 on one side. The threaded section 8332 can engage with the threads on the threaded section 8312 of the adjustment rod 831. When the engagement component 833 is pressed and slid into the sliding groove hole 824, the threaded section 8332 disengages from the threaded section 8312 of the adjustment rod 831. This allows the adjustment rod 831 to be quickly adjusted up and down freely, which is referred to as a rapid adjustment motion. When the threaded section 8332 of the engagement component 833 engages with the threaded section 8312 of the adjustment rod 831, the adjustment rod 831 can be slowly adjusted up and down by rotating the adjustment rod 831, which is referred to as fine adjustment.

As shown in FIGS. 2, 3, 4, 5, 6, and 7, the upper end of the adjustment screw 832 is connected to the first pressing block 834. The first pressing block 834 has a magnetic attraction element 8341 on the other side of its bottom surface that is connected to the adjustment screw 832. Furthermore, the first pressing block 834 extends towards one side of the fixed frame 82 and has a guiding block 8342 with a through-hole 8343 on top. The adjustment screw 832 passes through the through-hole 8343 and is connected to the first pressing block 834. The fixed frame 82 corresponds to the guiding block 8342 and has vertical guiding grooves 826. The guiding block 8342 fits into the guiding grooves 826, ensuring stability when the first pressing block 834 is moved up and down by the adjustment screw 832.

The first pressing block 834 can attract the second pressing block 835 with the magnetic attraction element 8341. The top surface of the second pressing block 835 corresponds to the magnetic attraction element 8341 of the first pressing block 834 and has a magnetic attraction element 8351 with a different magnetic polarity. This allows the second pressing block 835 to be stably magnetically attached to the bottom surface of the first pressing block 834. The bottom surface of the second pressing block 835 has a V-shaped pressing surface 8352. Both the first pressing block 834 and the second pressing block 835 can be adjusted in their up and down positions by the adjustment rod 831. Furthermore, the second pressing block 835 can easily be detached from or magnetically attached to the first pressing block 834, and it can be easily rotated to adjust the direction of the pressing surface 8352.

As shown in FIGS. 2, 3, 4, and 5, the abutment member 84 is inserted into the through-hole 823 below the fixed frame 82. The abutment member 84 has a through-rod portion 841 and an abutment portion 842. The abutment member 84 is inserted into the through-hole 823 using the through-rod portion 841.

As shown in FIG. 1, the first seat 51 has a support rod assembly 511, which includes a support member 512 and a support rod 513 inserted into the support member 512. The support rod 513 can rest on the support 311 of the first weight 31. The second seat 52 has a support rod assembly 521 at one end away from the first seat 51. The support rod assembly 521 includes a support member 522 and a support rod 523 inserted into the support member 522. The support rod 523 can rest on the support 321 of the second weight 32.

Figure 2:
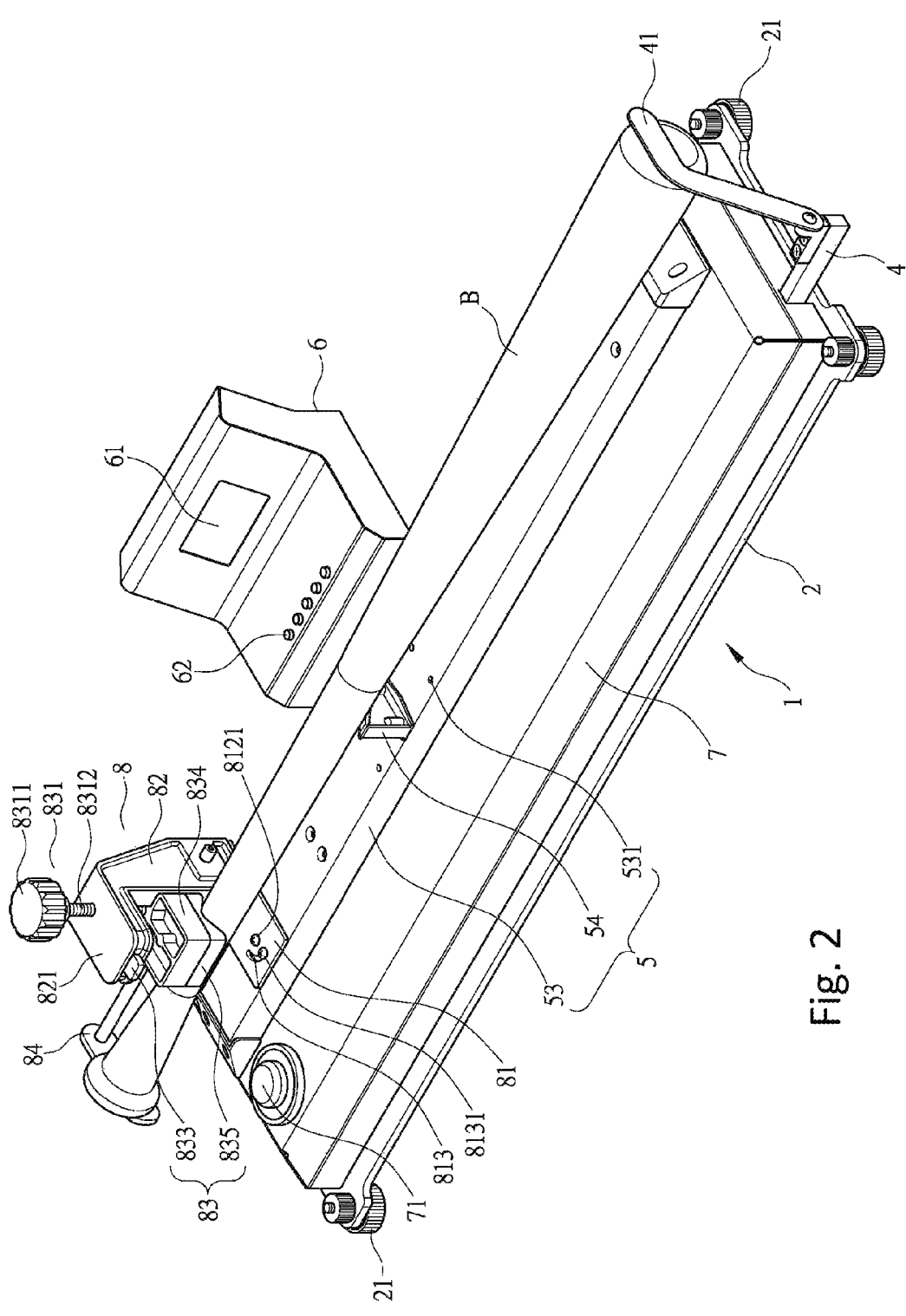
FIG. 2 is a three-dimensional view of a measurement device for swing-type exercise equipment in accordance with the disclosure.
Figure 3:
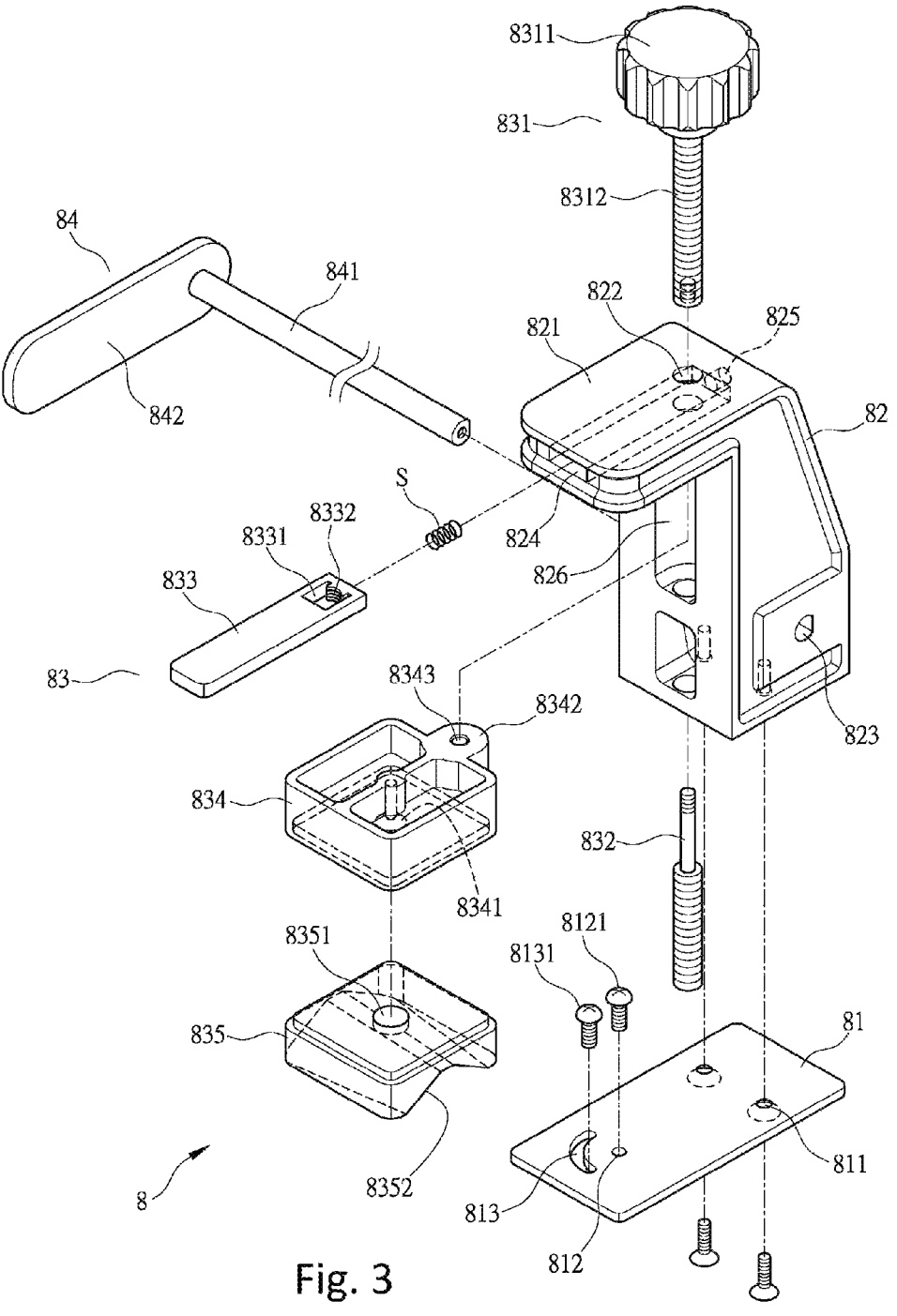
FIG. 3 is an exploded view of a pressure-holding unit in accordance with the disclosure.
Figure 4:
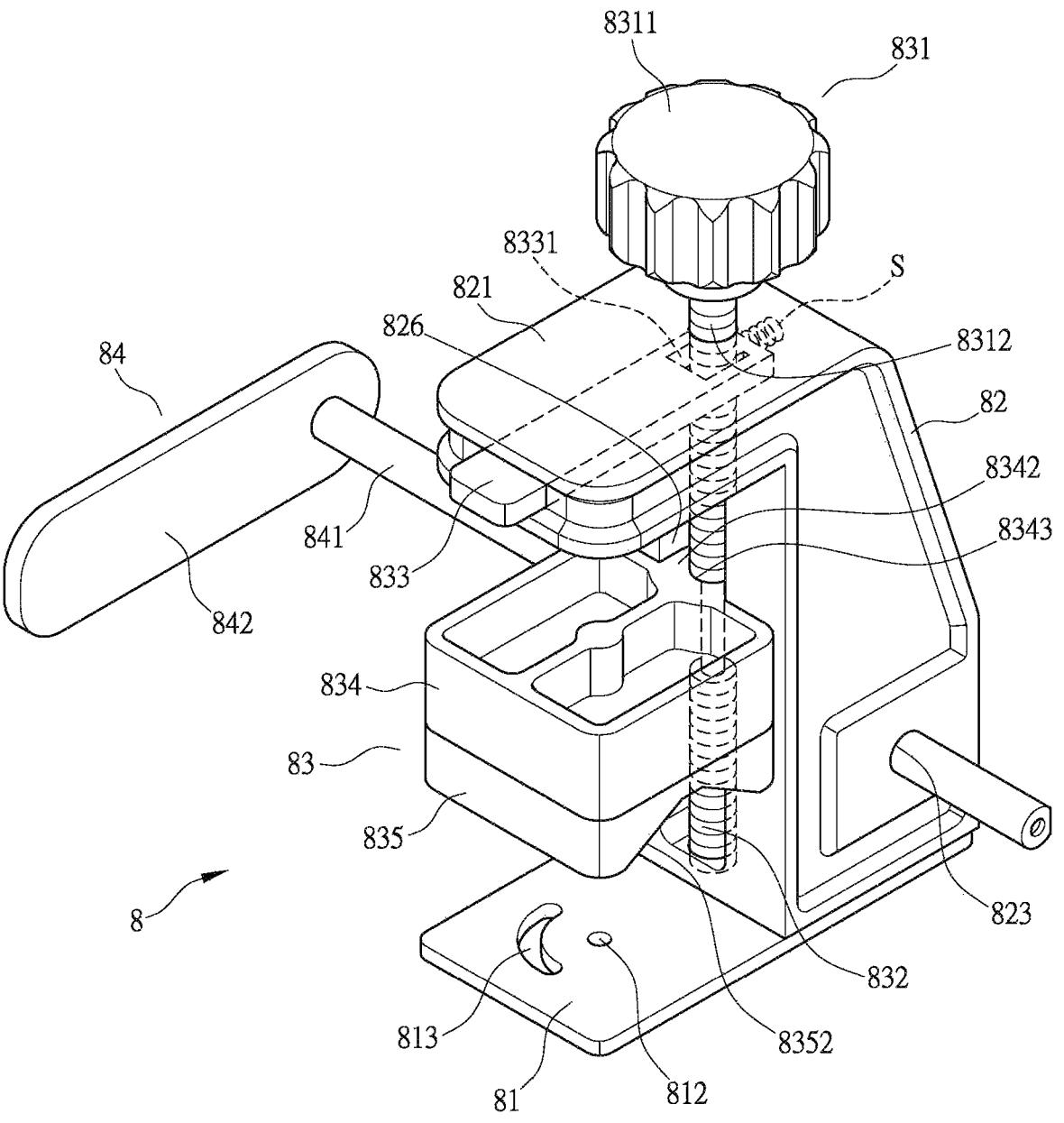
FIG. 4 is a three-dimensional view of a pressure-holding unit in accordance with the disclosure.
Figure 5:
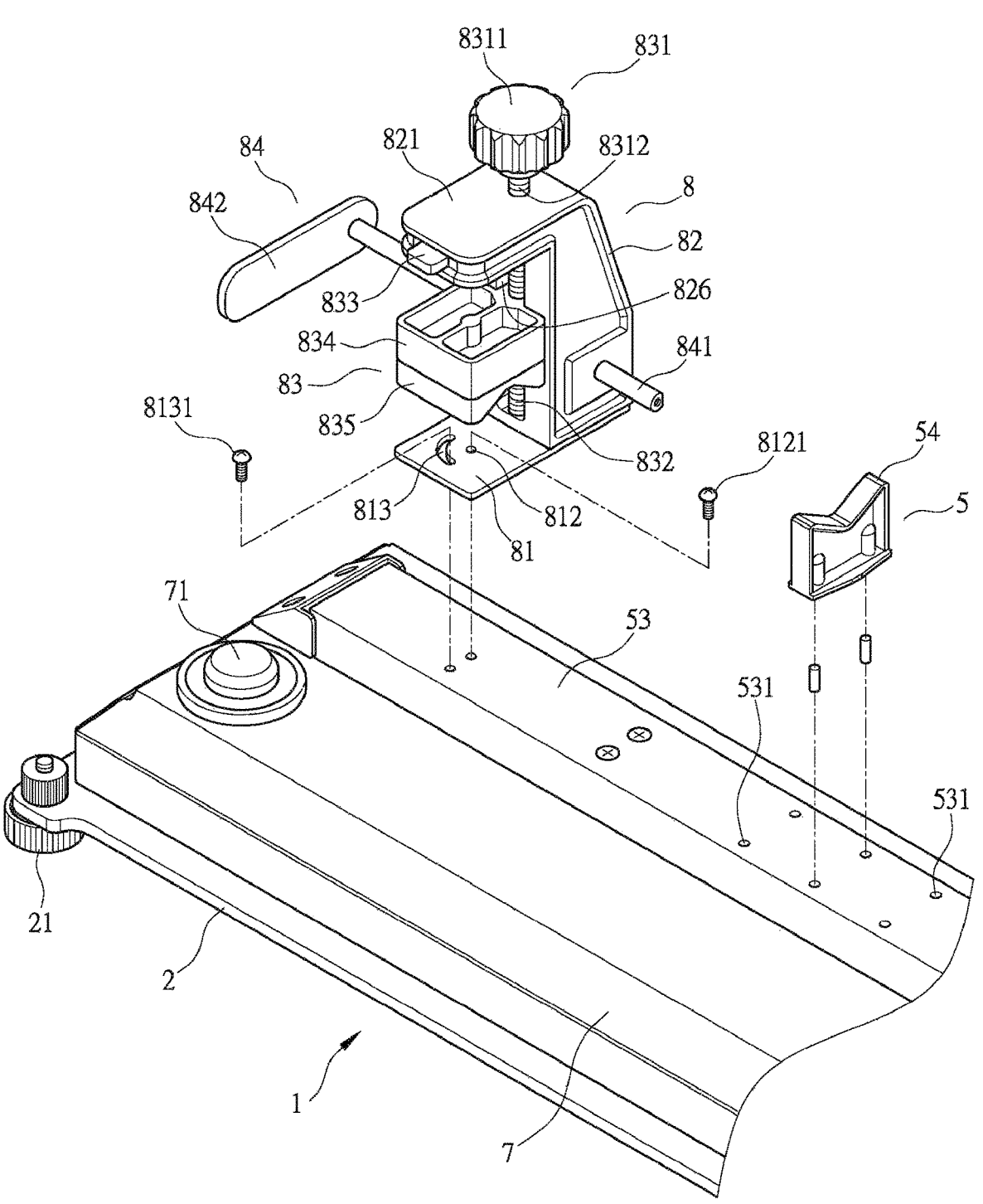
FIG. 5 is an exploded view of the pressure-holding unit and the measurement device in accordance with the disclosure.

As shown in FIGS. 1, 2, and 5, the support frame 53 is available for the placement of the first seat 51 and the second seat 52. The support frame 53 has multiple inserted holes 531 that can accommodate the insertion of the support base 54. The pressure holding unit 8 is locked on the support frame 53.

As shown in FIGS. 1 and 2, the calculation and display unit 6 is located on one side of the base 2, specifically on the side opposite to where the digital caliper unit 4 is located. The calculation and display unit 6 includes a display screen 61 and multiple operation buttons 62. The calculation and display unit 6 is electrically connected to the weighing unit 3, allowing it to calculate information such as the weight and center of mass (center of gravity) of the measured swinging sports equipment. The operation buttons 62 can control the operation of the calculation and display unit 6.

As shown in FIGS. 1 and 2, the cover body 7 is placed on top of the base 2, covering most of the weighing unit 3, scale seat unit 5, and digital caliper unit 4. The cover body 7 is equipped with a level indicator 71, which helps ensure the horizontal alignment of the base 2. In the center of the cover body 7, there is a long slot 72 that allows the scale seat unit 5 to protrude outside of the cover body 7.

Figure 6:
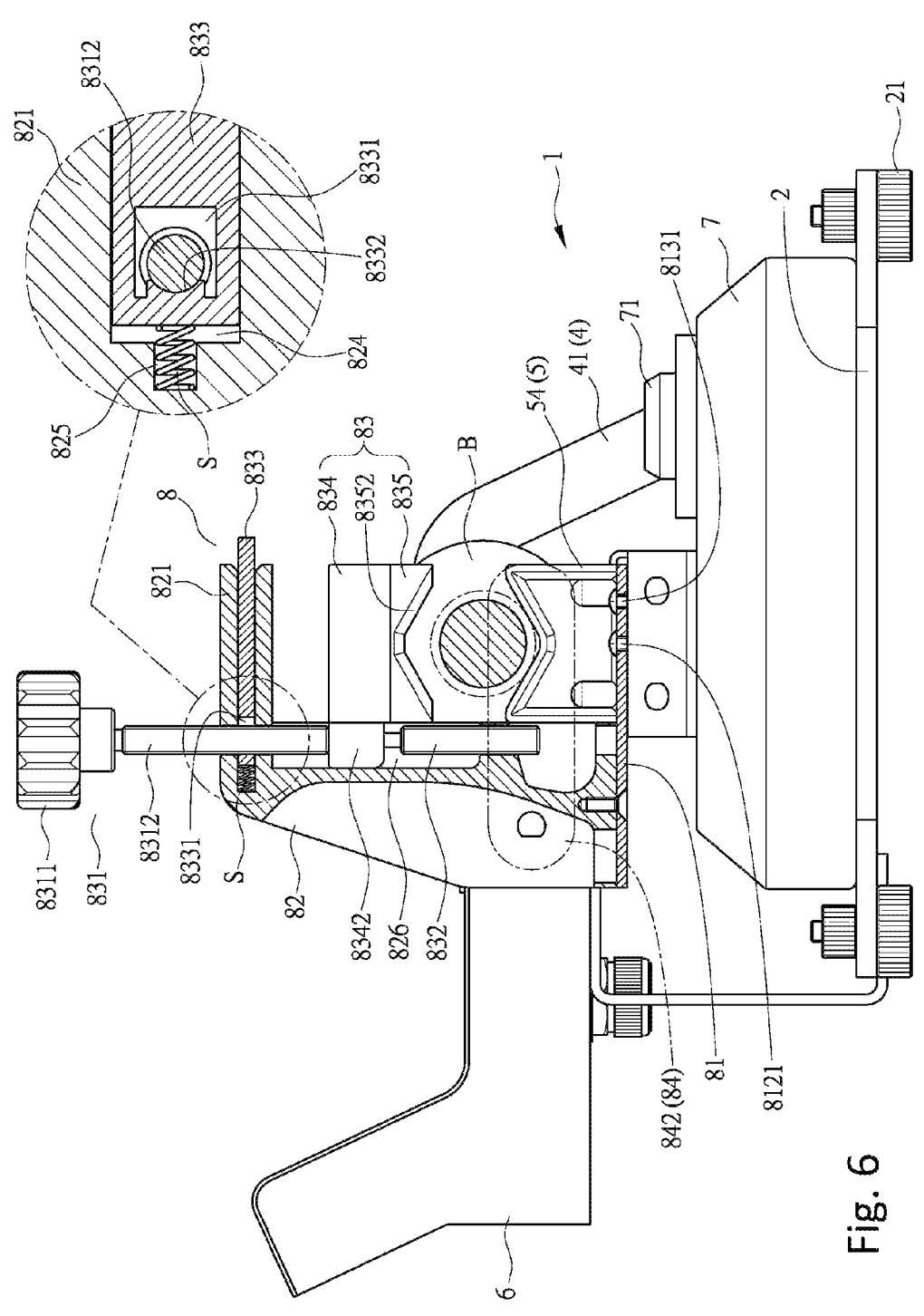
FIGS. 6 and 7 are schematic diagrams illustrating the operation of the pressure-holding unit in accordance with the disclosure.
Figure 7:
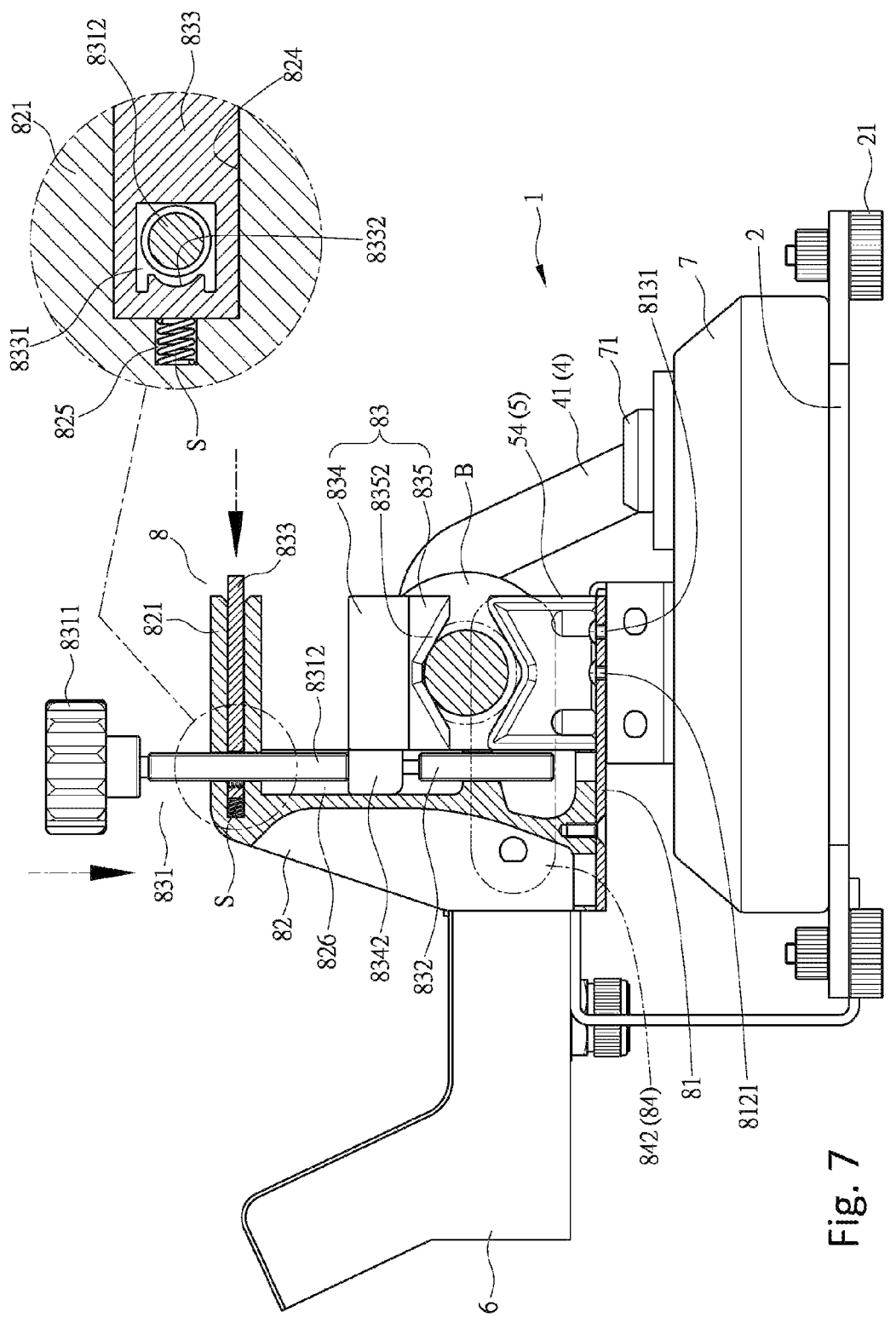

As shown in FIGS. 2, 6, and 7, the embodiment of this creation is illustrated using the example of measuring a baseball bat (B) as a swinging sports equipment. First, the support bracket 54 of the scale seat unit 5 is inserted into the insertion holes 531, adjusting the distance between the support bracket 54 and the pressure-holding unit 8 to meet the specifications for the grip force distance of international baseball bats. Next, the baseball bat (B) is placed on the support bracket 54 of the scale seat unit 5. The second pressure block 835 of the pressure-holding unit 8 is pressed against the bottom of the baseball bat (B), and the top abutment member 84 presses against the bottom end of the baseball bat (B). The measuring scale abutment piece 41 of the digital caliper unit 4 contacts the top end of the baseball bat (B). At the same time, the adjustment rod 831 of the pressure-holding unit 8 is rotated for fine adjustment, or the quick adjustment is made by pressing the clamping member 833 to ensure that the second pressure block 835 continues to be pressed against the bottom of the baseball bat (B). This allows for more precise measurements of the weight, length, mass center (center of gravity), and deviation point of the baseball bat (B) in its normal state.

Figure 8:
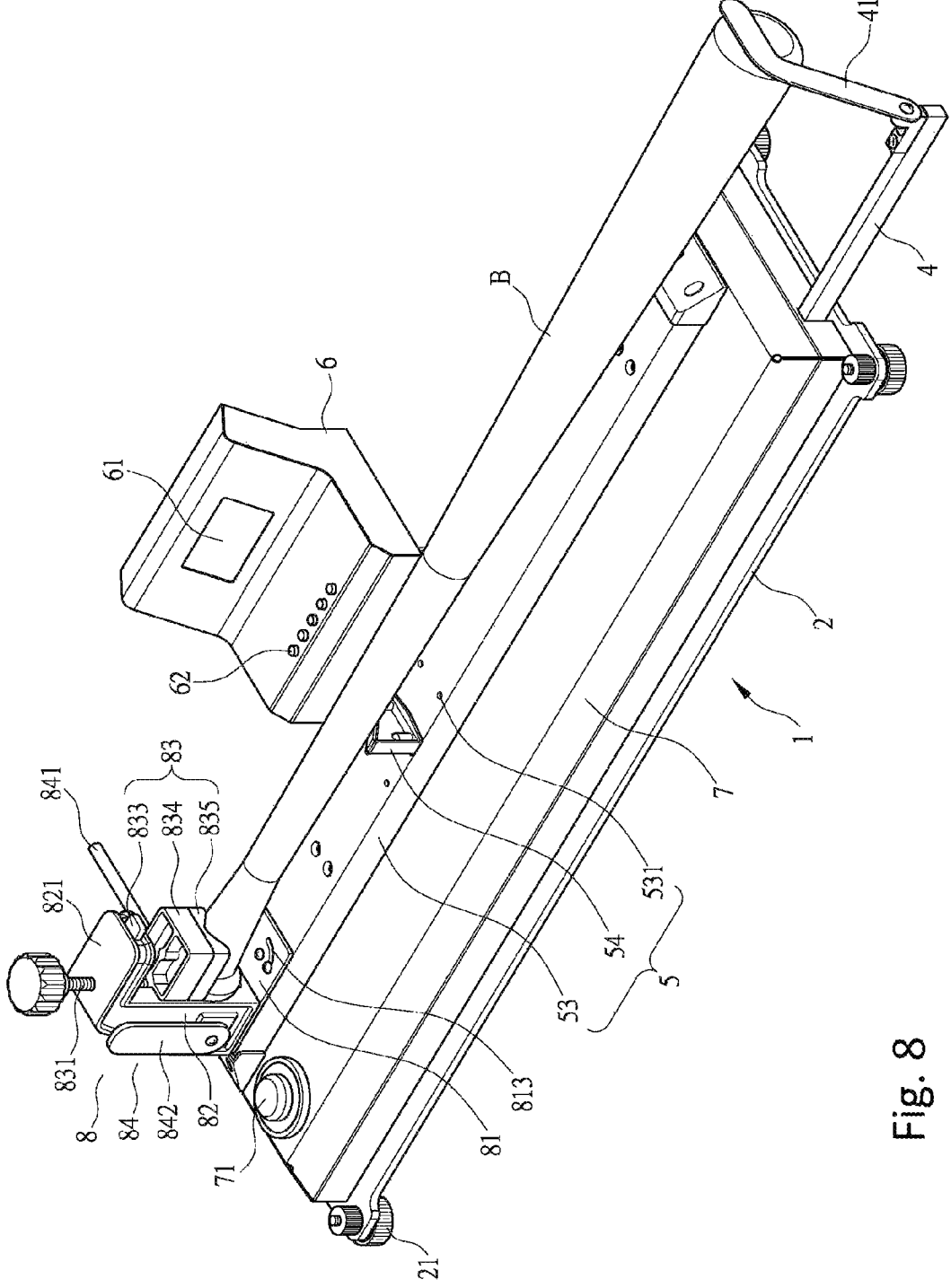
FIG. 8 is a second embodiment of a measurement device for swing-type exercise equipment in accordance with the disclosure.

As shown in FIG. 8, when a user wants to change the grip point of the baseball bat (B), for example, to grip it shorter (commonly known as choking up), the sweet spot for hitting also changes due to the change in grip point. Therefore, it is necessary to measure the different sweet spots for hitting at different grip points. First, insert the support bracket 54 of the scale seat unit 5 into the insertion holes 531, adjusting the distance between the support bracket 54 and the pressure-holding unit 8 to meet the specifications for the grip force distance of international baseball bats. Then, place the baseball bat (B) on the support bracket 54 of the scale seat unit 5. Rotate the pressure-holding unit 8 by 90 degrees so that the fixed bracket 82 can abut against the bottom end of the baseball bat (B). Press the second pressure block 835 of the pressure-holding unit 8 against the desired grip point on the baseball bat (B). The measuring scale abutment piece 41 of the digital caliper unit 4 is also brought into contact with the top end of the baseball bat (B). At the same time, press the clamping member 833 to allow the pressure-holding unit 83 to adjust quickly, ensuring that the second pressure block 835 is pressed against the top of the baseball bat (B). Then, use the adjustment rod 831 of the pressure-holding unit 83 to make fine adjustments to keep the second pressure block 835 continuously pressed against the bottom of the baseball bat (B). This allows for more precise measurements of the mass center (center of gravity) and deviation point of the baseball bat (B) at different grip points, thereby enhancing the user's understanding of the sweet spot for hitting the baseball bat (B) at different grip points.

The effectiveness of this creation lies in the measurement device 1 having at least a pressure-holding unit 8, wherein the pressure-holding unit 8 includes a base 81, a fixed bracket 82 on the base 81, and at least one pressure-holding unit 83 and a top abutment member 84 on the fixed bracket 82. The pressure-holding unit 83 comprises an adjustment rod 831 and an adjustment screw 832 connected to the adjustment rod 831, and the adjustment screw 832 is provided with a first pressure block 834 that is connected to a second pressure block 835 that can be freely connected and detached. The base 81 has a locking shaft hole 812 and a limiting hole 813, with a bolt 8121 threaded into the locking shaft hole 812 and a limiting bolt 8131 threaded into the limiting hole 813. The pressure-holding unit 8 can rotate freely about the bolt 8121 in the locking shaft hole 812 as a pivot point, with the limiting hole 813 and limiting bolt 8131 restricting the rotation angle of the pressure-holding unit 8. This facilitates the measurement of static mechanical characteristics such as length, weight, mass center (center of gravity), and the horizontal moment of inertia of the dynamic mechanical characteristics when gripping different parts of the swinging sports equipment, thereby enhancing the usability of the measurement device for the swinging sports equipment.

In summary, the present creation achieves the stated objectives and benefits through the measurement device for swinging sports equipment described above. It should meet the criteria of novelty, utility, and advancement, and accordingly, a patent application for a utility model is hereby submitted for your esteemed consideration. Your kind attention and favorable approval of the utility model patent are sincerely requested. Thank you.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE NUMERALS

1: Measurement device
2: Base
21: Support foot pad
22 Insert block
3: Weight unit
31 First weight unit
311 Support seat
32 Second weight unit
321 Support seat
4: Digital scale unit
41 Scale abutment
5: Scale seat unit
51 First scale seat
511 Support rod assembly
512 Support piece
52 Second scale seat
521 Support rod assembly
522 Support piece
53 Support frame
531 Insert hole
54 Support seat
6: Calculation and display unit
61 Display
62 Operation key
7: Cover body
71 Bubble level
72 Long groove hole
8: Pressure holding unit
81 Base
811 Lock hole
812 Locking shaft hole
8121 Bolt
813 Limitation hole
8131 Limitation bolt
82 Fixed frame
821 Projection
822 Hole
823 Through hole
824 Groove hole
825 Installation hole
826 Guide groove
83 Pressure holding assembly

831 Adjustment rod
8311 Handle section
8312 Screw section
832 Adjustment screw
833 Clamping piece
8331 Insert hole
8332 Threaded section
834 First pressure block
8341 Magnetic element
8342 Guide block
8343 Insert hole
835 Second pressure block
8351 Magnetic element
8352 Pressing surface
84 Top abutment
841 Pass-through section
842 Top abutment section
B: Baseball bat
S: Elastic element

What is claimed is:

1. A measuring device for a swinging sports apparatus, comprising:

at least one pressure-holding unit having a base, the base comprising a fixed frame having at least one pressure-holding assembly and a top abutment member;

wherein the at least one pressure-holding assembly includes an adjusting rod and an adjusting screw connected to the adjusting rod, the adjusting screw being provided with a first pressure block, the first pressure block being connected to a second pressure block that can be freely connected and detached;

wherein the base is provided with a locking shaft hole and a limiting hole, the locking shaft hole is threaded with a bolt, and the limiting hole is threaded with a limiting bolt;

wherein the pressure-holding unit is configured to rotate freely with the bolt in the locking shaft hole as a center of rotation; and wherein the limiting hole and the limiting bolt restrict a rotation angle of the pressure-holding unit.

2. The measuring device for a swinging sports apparatus according to claim 1, wherein an upper end of the fixed frame is convexly provided with a protruding portion on one side, and the protruding portion is provided with a through hole through which the pressure-holding assembly can pass.

3. The measuring device for a swinging sports apparatus according to claim 2, wherein the pressure-holding assembly from top to bottom sequentially includes the adjusting rod, the adjusting screw being threadedly connected below the adjusting rod, wherein an engagement member is engageable with the adjusting rod for upward and downward screw adjustment.

4. The measuring device for a swinging sports apparatus according to claim 3, wherein the first pressure block is provided at an upper end of the adjusting screw, and the second pressure block provided on the bottom surface of the first pressure block.

5. The measuring device for a swinging sports apparatus according to claim 4, further comprising a through hole extending below the fixed frame, and a top abutment member that is freely slidably disposed in the through hole.

6. The measuring device for a swinging sports apparatus according to claim 2, wherein the bottom surface of the first pressure block is provided with a magnetic adsorption element; wherein the top surface of the second pressure block corresponds to the magnetic adsorption element on the bottom surface of the first pressure block and is provided with a magnetic element having a different magnetic polarity; and wherein the second pressure block is magnetically adsorbed on the bottom surface of the first pressure block.

7. The measuring device for a swinging sports apparatus according to claim 2, wherein the first pressure block is convexly extended on one side facing the fixed frame with a guiding block, wherein the guiding block is provided with a through hole, wherein the adjusting screw extends through the through hole and is connected to the first pressure block; wherein the fixed frame corresponds to the guiding block and is provided with a guiding groove; and wherein the guiding block extends into the guiding groove.

8. The measuring device for a swinging sports apparatus according to claim 2, wherein the bottom surface of the second pressure block has a downwardly inclined V-shaped pressing surface.

* * * * *